Sept. 23, 1924.
C. W. SHANE
HANDLING IMPLEMENT
Filed March 28, 1923
1,509,265
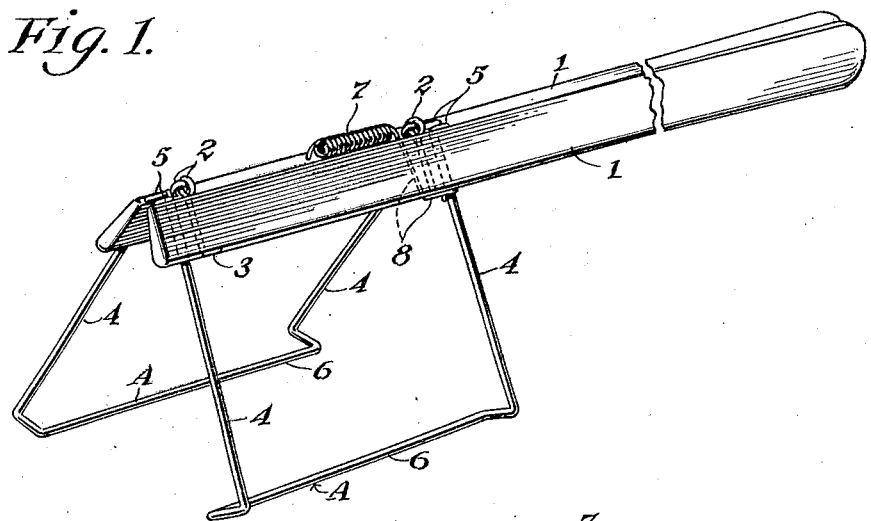
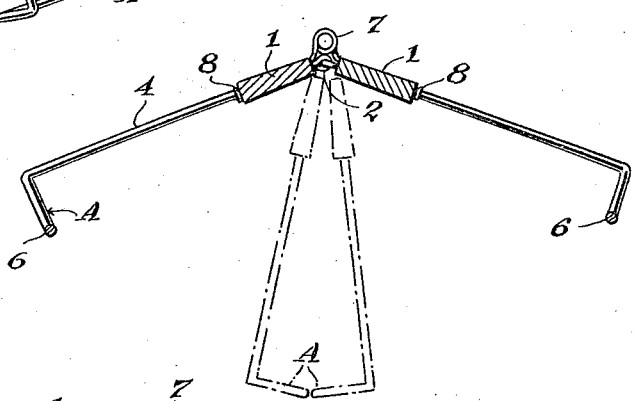
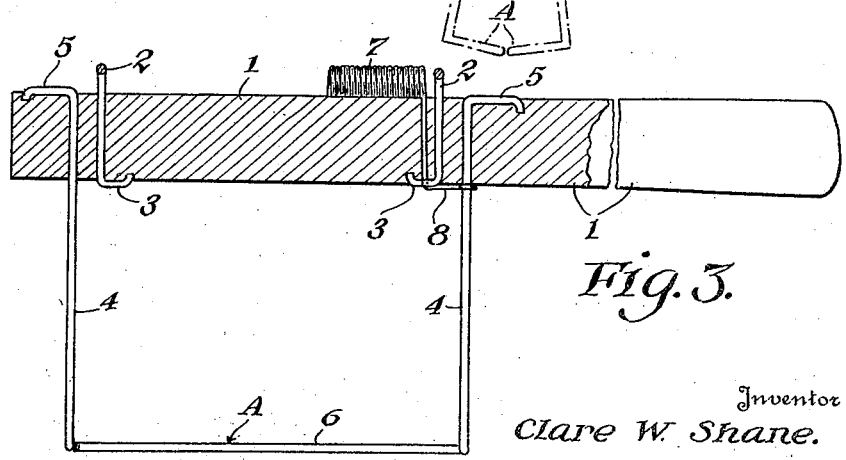
Inventor
Clare W. Shane.
By Watson E. Coleman
Attorney Patented Sept. 23, 1924.

1,509,265

UNITED STATES PATENT OFFICE.

CLARE W. SHANE, OF EMMETT, IDAHO, ASSIGNOR OF ONE-HALF TO WILLIAM H. SHANE, OF EMMETT, IDAHO.

HANDLING IMPLEMENT.

Application filed March 28, 1923. Serial No. 628,302.

*To all whom it may concern:*

Be it known that I, CLARE W. SHANE, a citizen of the United States, residing at Emmett, in the county of Gem and State of Idaho, have invented certain new and useful Improvements in Handling Implements, of which the following is a specification, reference being had to the accompanying drawings.

This invention relates to certain improvements in handling implements and has relation more particularly to a device of this general character especially designed and adapted for use in the lifting of hot plates, jars and other household utensils and the like and it is an object of the invention to provide a novel and improved device of this general character comprising two relatively movable jaws constructed in a manner whereby the outer portions of said jaws will come close together.

Another object of the invention is to provide a novel and improved device of this general character comprising relatively movable jaws together with means for automatically moving and maintaining said jaws in separated relation.

The invention consists in the details of construction and in the combination and arrangement of the several parts of my improved handling implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a handling implement constructed in accordance with an embodiment of my invention;

Figure 2 is a cross sectional view taken through the device as illustrated in Figure 1, a second position of the jaws being indicated by dotted lines;

Figure 3 is an enlarged fragmentary view partly in section and partly in elevation of one of the handle members and the parts associated therewith, the line of section being lengthwise of the handle member.

As disclosed in the accompanying drawings, my improved implement comprises two elongated and substantially flat handle members 1 preferably thirteen inches long. The handle members have extending outwardly from adjacent edge walls thereof the interlocking eye members 2 whereby the handle members 1 are connected for swinging movement one relative to the other. Each of the eye members preferably comprises a single strand of material to be turned upon itself and having the returned strand directed through the handle member with the extremities clinched as at 3 against the outer edge wall of the handle member.

Carried by each of the handle members 1 is a jaw A formed from a single strand of material of requisite gauge, said jaw being substantially U-shaped in form. Each of the jaws A extends outwardly from the outer edge wall of a handle member 1 and the extremities of the side members 4 of said jaw are disposed through a handle member with the extremities thereof clinched as at 5 against the inner edge wall of the handle member whereby said jaw is effectively maintained in applied position.

The intermediate portion 6 of each of the jaws A is inwardly offset so that when the jaws are moved one toward the other said intermediate or outer portion 6 will have close contact one with the other and which is of particular advantage in picking up hot plates, kettle covers and the like.

My improved implement has been found of particular advantage in connection with jars for use in canning fruit and meats as the jars may be effectively engaged between the jaws A while in the boiling water and readily removed therefrom and thereby eliminating the necessity of dipping or pouring off the water and letting the jars cool so that they can be lifted by hand.

When the jaws A are moved one toward the other, the handle members 1 swing into overlying relation. Interposed between the inner edge walls of the handle members 1 and preferably adjacent the inner ends of the jaws A is provided a coil spring 7 having its extremities extended as at 8 and directed through the handle members 1 and coiled or otherwise secured to the inner side members 4 of the jaws. This spring 7 serves to automatically impose separating movement to the handle members 1 but the tension of the spring is insufficient to spring the handle members 1 outwardly into coplanar relation or such movement is less than 180° but in angular relation as is clearly illustrated in the accompanying drawings so that when the handle members are gripped it will be assured that the jaws A will have the desired relative movement one toward the other.

From the foregoing description it is thought to be obvious that a handling implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A handling implement of the class described comprising two elongated and relatively flat handle members, means for hingedly connecting the marginal portions of the handle members for swinging movement one relative to the other, jaws carried by said handle members and extending laterally beyond the free marginal portions of the jaws, a coil spring disposed along the hingedly connected marginal portions of the handle members and positioned inwardly of and adjacent to the inner ends of the jaws, the extremities of the spring being extended through the handle members and secured to the inner ends of the jaws, said spring coacting with the handle members to automatically swing the same one away from the other.

In testimony whereof I hereunto affix my signature.

CLARE W. SHANE.